United States Patent
Pfeiffer et al.

(10) Patent No.: US 7,371,041 B2
(45) Date of Patent: May 13, 2008

(54) ASSEMBLY STATION WITH ROTATABLE TURRET WHICH FORMS AND UNLOADS A COMPLETED STACK OF ARTICLES

(75) Inventors: Michael W. Pfeiffer, Savage, MN (US); Eric D. Johnson, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 165 days.

(21) Appl. No.: 10/106,755

(22) Filed: Mar. 26, 2002

(65) Prior Publication Data
US 2003/0044267 A1 Mar. 6, 2003

Related U.S. Application Data

(60) Provisional application No. 60/316,067, filed on Aug. 30, 2001.

(51) Int. Cl.
*B65G 57/30* (2006.01)
*B65G 60/00* (2006.01)
*B65G 57/00* (2006.01)
*B66C 1/00* (2006.01)

(52) U.S. Cl. .................. 414/795.2; 414/27; 414/789.9; 414/790.2; 414/794.9; 414/223.01; 294/93

(58) Field of Classification Search ............... 29/759, 29/603.03, 729, 281.5, 737, 783; 294/96, 294/93, 94; 414/27, 794.9, 795.2, 908, 789.7, 414/790.6, 935, 941, 790.9, 789.9, 798.5, 414/791, 223.01, 796.9; 270/52.3; 700/218, 700/121; 198/346.2
See application file for complete search history.

(56) References Cited

U.S. PATENT DOCUMENTS 2,283,629 A * 5/1942 Heftler .................. 29/433

(Continued)

FOREIGN PATENT DOCUMENTS

EP 0 626 635 A2 11/1994

(Continued)

OTHER PUBLICATIONS

A Statistical Modeling Approach to Location Estimation; IEEE Transactions on Mobile Computing; vol. 1, No. 1, Jan.-Mar. 2002; pp. 56-69; Roos et al.

(Continued)

*Primary Examiner*—Saul Rodriguez
*Assistant Examiner*—Gregory W Adams
(74) *Attorney, Agent, or Firm*—Fellers, Snider, et al.

(57) ABSTRACT

Method and apparatus for forming and unloading a completed stack of articles. An assembly station includes a rotatable turret from which at least one stacker arm projects. The turret rotates to each of a number of article loading positions to sequentially load articles onto the arm in a desired order. The turret is then advanced to allow the articles to be concurrently unloaded from the stacker arm at an unloading position. In an automated disc drive manufacturing environment, the articles comprise respective numbers of magnetic recording discs and intervening disc spacers which are arranged into a disc/spacer stack as the stacker arm is advanced to a number of disc feeder and spacer feeder stations. The completed disc/spacer stack is then unloaded onto a spindle motor hub. Additional arms preferably project from the turret so that, as the turret rotates, multiple stacks are simultaneously formed and sequentially unloaded.

7 Claims, 12 Drawing Sheets

U.S. PATENT DOCUMENTS

| | | | |
|---|---|---|---|
| 2,350,273 A * | 5/1944 | Decker ..................... 414/27 |
| 3,926,320 A * | 12/1975 | Shively et al. ............... 414/796 |
| 4,052,053 A * | 10/1977 | Hasegawa et al. .......... 271/187 |
| 4,071,149 A * | 1/1978 | Deguchi ..................... 414/27 |
| 4,196,511 A * | 4/1980 | Kolosov et al. ............... 29/730 |
| 4,201,505 A * | 5/1980 | Gerhart et al. ................. 414/27 |
| 4,290,734 A | 9/1981 | Van Breen |
| 4,332,066 A | 6/1982 | Hailey et al. |
| 4,354,603 A | 10/1982 | Dunn |
| 4,394,899 A * | 7/1983 | Fluck ......................... 198/408 |
| 4,400,885 A | 8/1983 | Consales |
| 4,409,736 A | 10/1983 | Seltzer |
| 4,502,589 A * | 3/1985 | Fichtner ................... 198/468.2 |
| 4,595,334 A | 6/1986 | Sharon |
| 4,612,620 A | 9/1986 | Davis et al. |
| 4,789,292 A | 12/1988 | Holcomb |
| 4,910,869 A | 3/1990 | Labrijn |
| 4,921,397 A * | 5/1990 | Watanabe ................. 414/788.4 |
| 5,104,108 A * | 4/1992 | Honegger ................... 270/52.3 |
| 5,104,162 A * | 4/1992 | Watanabe ..................... 29/274 |
| 5,116,190 A | 5/1992 | Silke |
| 5,151,008 A * | 9/1992 | Ishida et al. ............... 414/744.5 |
| 5,202,929 A | 4/1993 | Lemelson |
| 5,287,266 A | 2/1994 | Malec et al. |
| 5,403,056 A * | 4/1995 | Wallace ..................... 294/98.1 |
| 5,419,674 A | 5/1995 | Chang |
| 5,485,634 A | 1/1996 | Weiser et al. |
| 5,544,321 A | 8/1996 | Theimer et al. |
| 5,548,660 A | 8/1996 | Lemelson |
| 5,552,806 A | 9/1996 | Lenchik |
| 5,555,376 A | 9/1996 | Theimer et al. |
| 5,612,068 A * | 3/1997 | Kempf et al. ................. 425/574 |
| 5,627,549 A | 5/1997 | Park |
| 5,642,303 A | 6/1997 | Small et al. |
| 5,649,300 A | 7/1997 | Snyder et al. |
| 5,743,965 A * | 4/1998 | Nishimura et al. ......... 118/712 |
| 5,751,221 A | 5/1998 | Stanfield et al. |
| 5,835,061 A | 11/1998 | Stewart |
| 5,877,571 A * | 3/1999 | Brooks ..................... 360/99.12 |
| 5,907,491 A | 5/1999 | Canada et al. |
| 5,910,799 A | 6/1999 | Carpenter et al. |
| 5,960,085 A | 9/1999 | de la Huerga |
| 5,987,735 A * | 11/1999 | Horning et al. ............... 29/737 |
| 6,011,487 A | 1/2000 | Plocher |
| 6,041,488 A * | 3/2000 | Wang ..................... 29/603.03 |
| 6,049,969 A | 4/2000 | Jenkins et al. |
| 6,060,993 A | 5/2000 | Cohen |
| 6,158,112 A * | 12/2000 | Kim et al. ..................... 29/759 |
| 6,167,464 A | 12/2000 | Kretschmann |
| 6,211,799 B1 | 4/2001 | Post et al. |
| 6,227,378 B1 * | 5/2001 | Jones et al. ................. 209/698 |
| 6,236,335 B1 | 5/2001 | Goodwin, III |
| 6,275,748 B1 * | 8/2001 | Bacchi et al. ............... 700/275 |
| 6,282,455 B1 | 8/2001 | Engdahl |
| 6,355,896 B1 * | 3/2002 | Cresgy ..................... 209/583 |
| 6,359,711 B1 | 3/2002 | Cole et al. |
| 6,362,783 B1 | 3/2002 | Sugiura et al. |
| 6,446,004 B1 | 9/2002 | Cao et al. |
| 6,453,541 B1 * | 9/2002 | Guthrie et al. ........... 29/603.03 |
| 6,481,956 B1 * | 11/2002 | Hofmeister ................. 414/806 |
| 6,499,936 B2 * | 12/2002 | Ishigame ................. 414/744.5 |
| 6,536,098 B1 * | 3/2003 | Luo et al. ................. 29/603.03 |
| 6,578,257 B1 * | 6/2003 | Wang ......................... 29/759 |
| 6,651,311 B1 * | 11/2003 | Kim et al. ................. 29/603.03 |
| 6,793,211 B2 * | 9/2004 | Muller ..................... 270/52.27 |
| 6,877,215 B2 * | 4/2005 | Pfeiffer ........................ 29/729 |
| 2001/0018349 A1 | 8/2001 | Kinnunen et al. |
| 2001/0024174 A1 | 9/2001 | Turner |
| 2002/0007407 A1 | 1/2002 | Klein |
| 2002/0030094 A1 | 3/2002 | Curry et al. |
| 2002/0058499 A1 | 5/2002 | Ortiz |
| 2002/0125886 A1 | 9/2002 | Bates et al. |
| 2002/0161633 A1 | 10/2002 | Jacob et al. |
| 2002/0167417 A1 | 11/2002 | Wells, II et al. |
| 2003/0011467 A1 | 1/2003 | Suomela |

FOREIGN PATENT DOCUMENTS

| | | | |
|---|---|---|---|
| EP | 0 992 921 A2 | 12/2000 |
| EP | 0 801 342 B1 | 1/2003 |
| GB | 2 365 662 | 2/2002 |
| JP | 359007625 A * | 1/1984 | ................. 414/27 |
| WO | WO 00/17737 | 3/2000 |
| WO | WO 00/50919 | 8/2000 |
| WO | WO 01/82032 A2 | 1/2001 |
| WO | WO 01/16607 A2 | 3/2001 |
| WO | WO 01/41546 A2 | 6/2001 |
| WO | WO 02/05107 A1 | 1/2002 |
| WO | WO 02/12992 A2 | 2/2002 |
| WO | WO 02/13557 A1 | 2/2002 |
| WO | WO 02/43428 A1 | 5/2002 |
| WO | WO 02/056274 A1 | 7/2002 |
| WO | WO 02/054813 A1 | 11/2002 |

OTHER PUBLICATIONS

A Probabilistic Approach to WLAN User Location Estimation; International Journal of Wireless Information Networks, vol. 9, No. 3, pp. 155-164; Roos, et al.

A Statistical Modeling Approach To Location Estimation; Master's Thesis, Univ. of Helsinki, Department of Computer Science, May 5, 2001, Teemu Tonteri.

* cited by examiner

ASSEMBLY STATION WITH ROTATABLE TURRET WHICH FORMS AND UNLOADS A COMPLETED STACK OF ARTICLES

RELATED APPLICATIONS

This application claims priority to U.S. Provisional Application No. 60/316,067 filed Aug. 30, 2001.

FIELD OF THE INVENTION

The claimed invention relates generally to the field of automated assembly equipment and more particularly, but without limitation, to an automated assembly station for forming a disc stack assembly of a disc drive data storage device.

BACKGROUND OF THE INVENTION

Disc drive data storage devices are commonly used as the primary data storage and retrieval devices in modern computer systems. In a typical disc drive, data are magnetically stored on one or more discs that are rotated by a spindle motor at a constant high speed. The discs are accessed by a rotary actuator assembly having a corresponding number of read/write heads that fly adjacent the respective surfaces of the discs.

The discs are axially aligned and stacked about a spindle motor hub. Typically, one or more disc spacers are interleaved with the discs to form a disc/spacer stack, with the spacers serving to provide the various discs with the desired axial spacing within the stack. Once completed, a disc clamp is installed to secure the disc/spacer stack to the spindle motor hub. The assembled spindle motor hub, disc(s), spacer(s) and clamp is collectively referred to as a "disc stack assembly."

Disc drives are formed in highly automated manufacturing environments. A pallet system is typically employed wherein a pallet (tray) is provided for the assembly of each disc drive. The pallet is provided with an initial set of articles (such as a base deck) and the pallet is moved along a conveyor system to a succession of assembly stations wherein articles are added to form the drive.

In the current generation, automated assembly stations that build disc stack assemblies-place one article at a time onto the spindle motor hub. For example, a first robotic arm is manipulated to place a first disc onto the hub and then a second robotic arm places a first spacer onto the first disc. These operations are repeated until the final desired total numbers of discs and spacers have been added to the stack. The time to complete the stack is proportional to the number of discs in the stack.

A problem with this approach is that other assembly stations (such as a head merge station wherein the actuator is merged with the disc stack assembly) do not have cycle times that depend on the number of discs in the stack. The result is that the disc stack assembly station can induce a bottleneck, or line slowdown, in the flow of pallets through the assembly process. Similar bottlenecks can be observed in other types of automated processing lines that handle other types of stacked articles.

Additional delays in the assembly process due to the existing configuration of disc stack assembly stations relate to the use of conventional vacuum chuck type end effectors which apply a vacuum to grasp and release the discs and spacers. Such end effectors require precise planar alignment with the associated disc or spacer feeder and are susceptible to damage such as scratches on the articles which can prevent formation of a reliable vacuum seal. Also, there is a small amount of latency time required for the creation and the release of the vacuum; this latency time is required for each spacer and disc added to the stack and can add up to a significant amount of time when a large number of discs and spacers are employed in the stack.

Accordingly, there is a need for improvements in the art for more efficient assembly of stacked articles, such as discs and spacers, in an automated assembly process.

SUMMARY OF THE INVENTION

The claimed invention is generally directed to a method and apparatus for forming and unloading a completed stack of articles.

In accordance with preferred embodiments, an assembly station is provided having at least a first article feeder station which sequentially provides a plurality of first articles at a first loading position and a second article feeder station which sequentially provides a plurality of second articles at a second loading position. A turret assembly supports a stacker arm.

During operation, the turret assembly advances the stacker arm to the first loading position to load a selected first article, advances the stacker arm to the second loading position to load a selected second article adjacent the first selected article, and then moves the stacker arm to an unloading position where the first and second selected articles are concurrently unloaded from the arm. Additional arms preferably project from the turret so that, as the turret rotates, multiple stacks of articles are simultaneously formed and sequentially unloaded.

In a preferred embodiment, the assembly station is used in a disc drive automated assembly process and is configured to assemble magnetic recording discs and disc spacers into disc/spacer stacks. Each completed disc/spacer stack is unloaded onto a spindle motor hub. Disc/spacer stacks are formed in advance of arrival of the associated spindle motor hubs in the disc drive process. This removes bottlenecks in the assembly process.

In a preferred approach, the respective numbers of disc feeder stations, spacer feeder stations and stacker arms are selected so that the turret assembly rotates in a common direction to form and unload a completed disc/spacer stack over each complete revolution. In another preferred approach, the turret assembly is configured to selectively move in opposite rotational directions to accumulate the desired numbers of discs and spacers. An advantage of this latter approach is the ability to build both fully populated disc drives (i.e., drives with a full number of discs) and depopulated disc drives (i.e., drives with a reduced number of discs) in the same assembly process in an efficient manner.

These and various other features and advantages which characterize the claimed invention will become apparent upon reading the following detailed description and upon reviewing the associated drawings.

DETAILED DESCRIPTION

Figure 1:
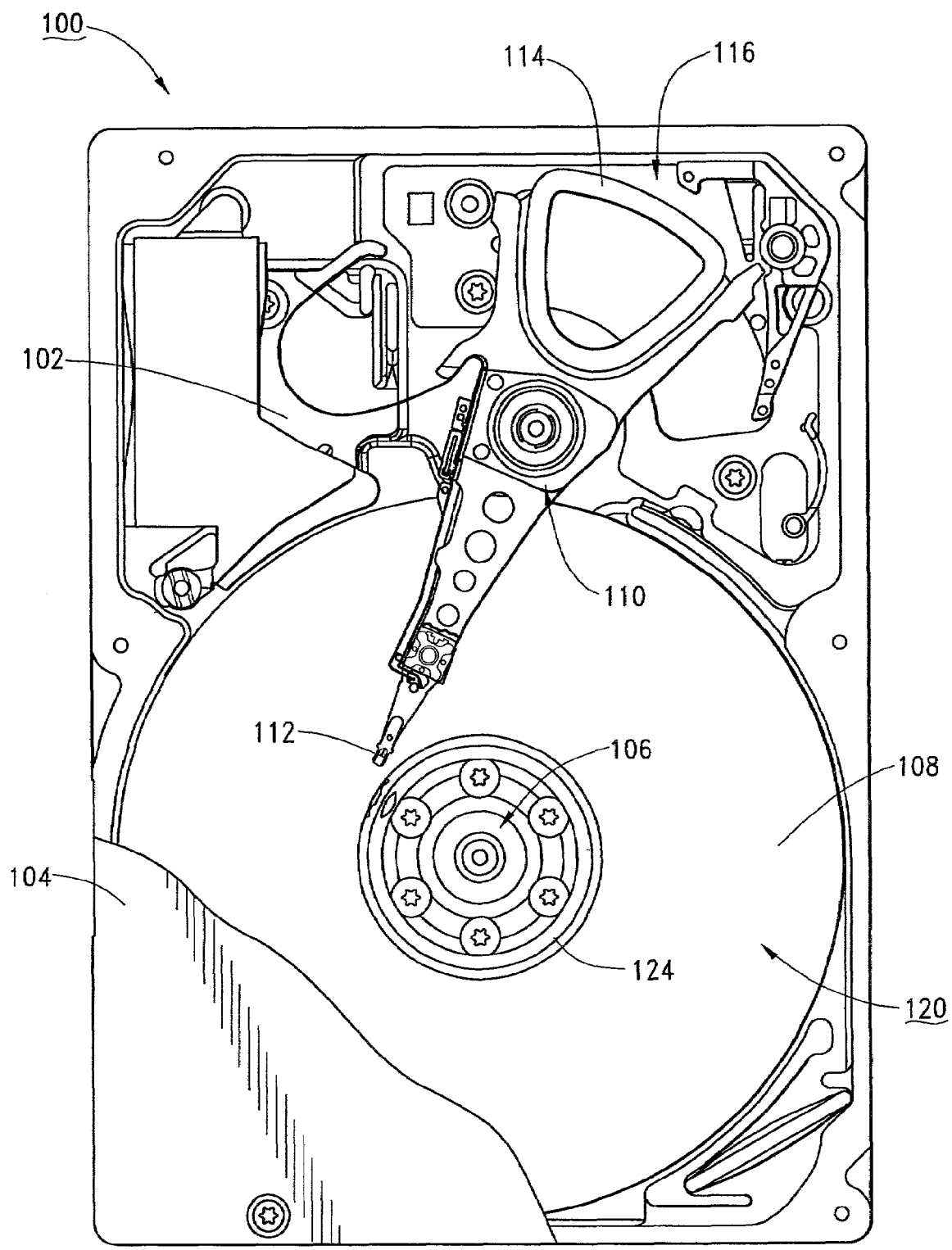
FIG. 1 is a plan view of a disc drive having a disc stack assembly constructed in accordance with preferred embodiments of the present invention.

In order to describe an exemplary environment in which the claimed invention can be advantageously practiced, it will be helpful to first provide a brief overview of a disc drive data storage device 100, as shown in FIG. 1. The disc drive 100 has a base deck 102 and a top cover 104 (shown in partial cutaway) which cooperate to form a sealed housing. A spindle motor 106 rotates a number of magnetic recording discs 108 at a constant, high speed. A rotary actuator assembly 110 supports a corresponding number of data transducing heads 112 adjacent recording surfaces of the discs 108. The actuator assembly 110 is rotated through application of current to a coil 114 of a voice coil motor (VCM) 116.

Figure 2:
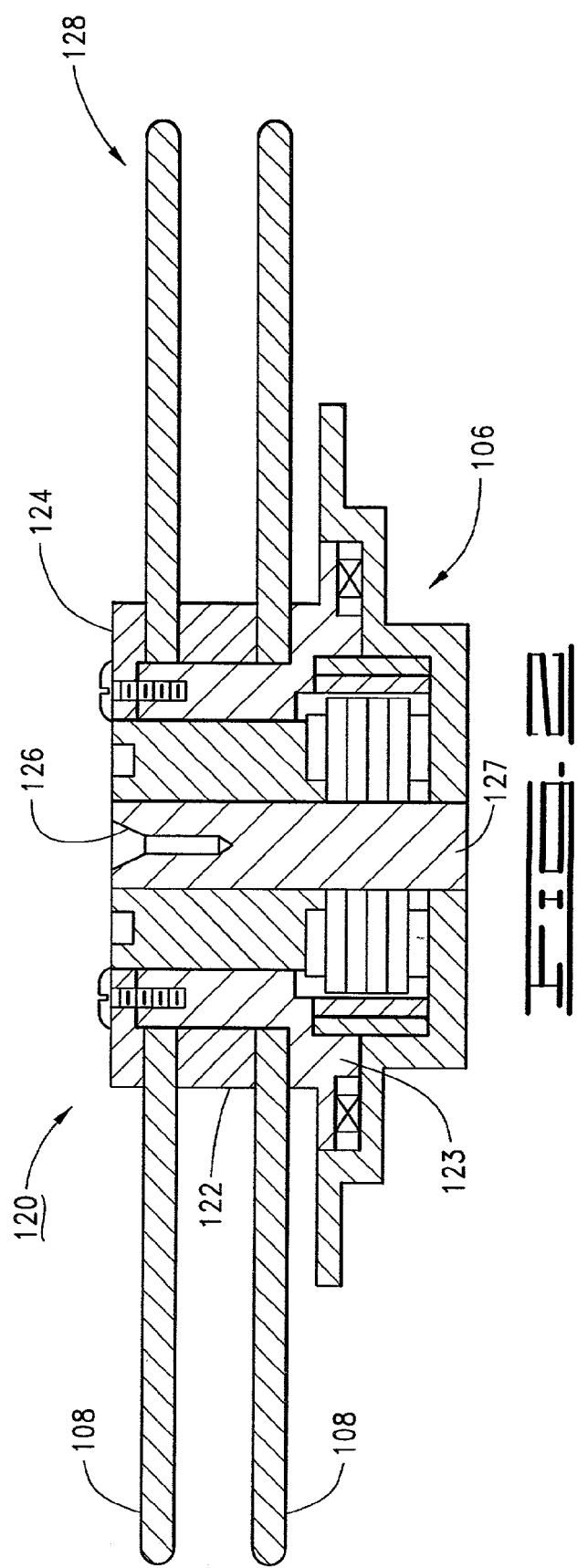
FIG. 2 is an elevational cross-sectional view of the disc stack assembly of the disc drive of FIG. 1.

FIG. 2 shows a cross-sectional elevational view of a disc stack assembly 120 of the disc drive 100. The disc stack assembly 120 is shown to include a pair of discs 108, a disc spacer 122 between the discs 108, a rotatable spindle motor hub 123 and a disc clamp 124. An alignment feature 126 comprising a threaded aperture having an interior chamfered wall allows insertion of a threaded fastener (not shown) through the top cover 104 to secure the top cover to a central shaft 127 of the spindle motor 106.

The discs 108 and spacer 122 are referred to herein as a disc/spacer stack 128. While the disc/spacer stack 128 is shown to include two discs 108 and one spacer 122, any respective numbers of discs and spacers can be employed as desired.

Figure 3:
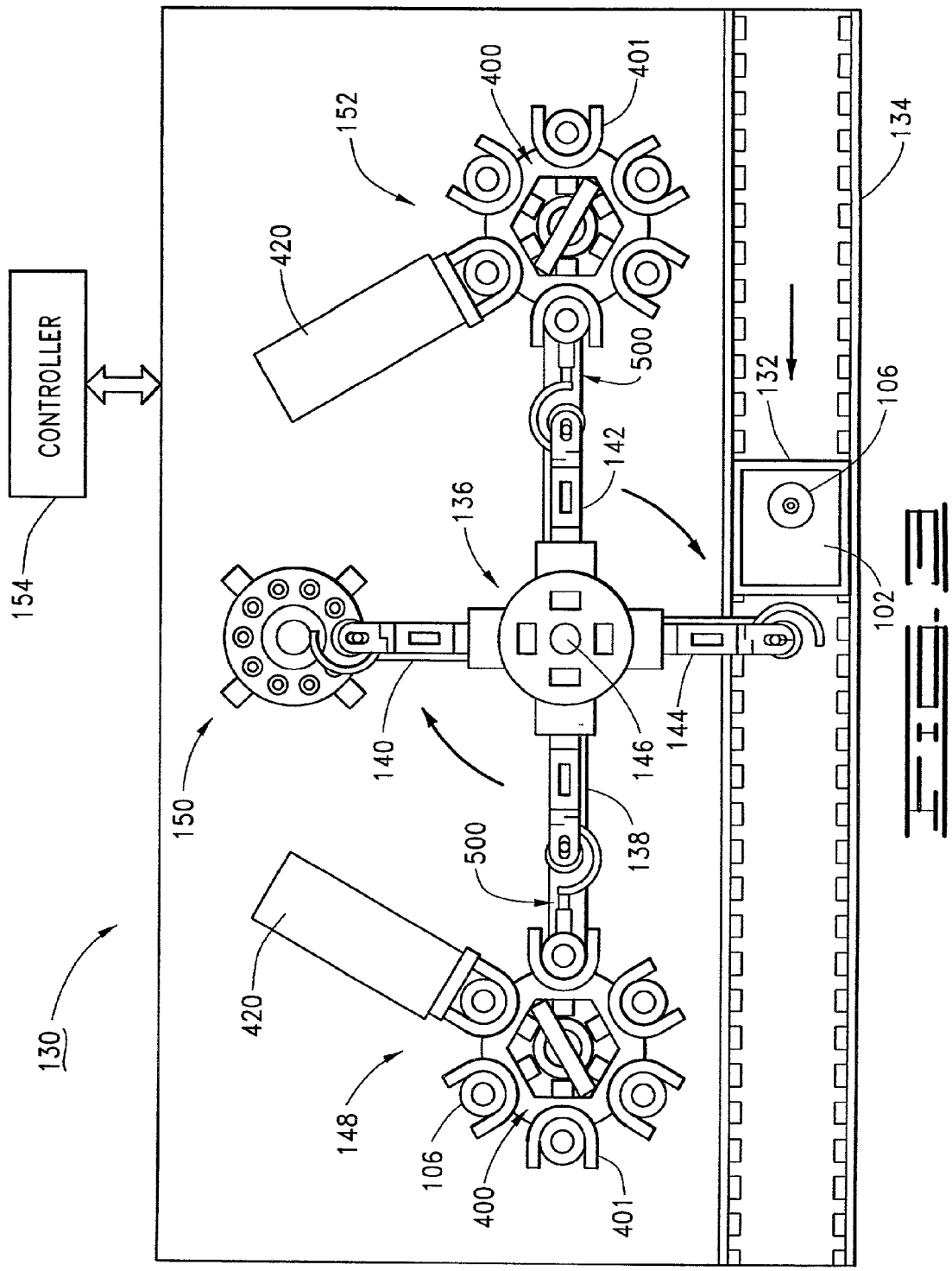
FIG. 3 is a top plan view of an automated disc stack assembly station constructed and operated in accordance with preferred embodiments of the present invention to build a population of disc stack assemblies such as exemplified by that shown in FIG. 2.

FIG. 3 provides a top plan view of a disc stack assembly station 130 constructed and operated in accordance with preferred embodiments of the present invention to assemble disc stack assemblies such as shown in FIG. 2. As explained below, the assembly station 130 generally operates to form a completed disc/spacer stack 128 and then place the completed stack onto a spindle motor hub 123. It will be understood that the disc stack assembly station 130 is preferably used as part of an overall automated disc drive assembly process that results in the fabrication of a population of nominally identical disc drives 100.

Pallets (one of which is shown at 132) hold partially assembled disc drives and are moved along a conveyor 134 to a position to receive a disc/spacer stack 128. A rotatable turret assembly 136 includes a plurality of nominally identical robotic assembly arms, or stacker arms 138, 140, 142 and 144, which project at substantially 90-degree intervals as shown. The turret assembly is rotatable about a central axis 146 to concurrently bring the arms 138, 140, 142 and 144 adjacent various loading and unloading positions. As shown in FIG. 3, the arm 138 is adjacent a first disc feeder system 148, the arm 140 is adjacent a spacer feeder system 150, the arm 142 is adjacent a second disc feeder system 152 and the arm 144 is at a disc unloading position over the conveyor 134.

In a preferred embodiment, the assembly station 130 is configured to assemble and load disc/spacer stacks having two discs 108 and one interposed spacer 122 as shown in FIG. 2. During an operational cycle the turret assembly 136 operates to move the assembly arm 138 to the first disc feeder system 148 to load a first disc 108, rotates 90 degrees to move the assembly arm 138 to the disc spacer feeder system 150 to load a spacer 122, rotates 90 degrees to the second disc feeder system 152 to load a second disc 108, and then rotates another 90 degrees to the unloading position to unload the completed disc/spacer stack 128 onto the spindle motor hub 123.

During these operational steps, the remaining arms 140, 142 and 144 perform similar operations to pick up discs and spacers and unload completed disc/spacer stacks onto other associated spindle motor hubs. In this way, the assembly station 130 continuously forms disc/spacer stacks 128 while new pallets 132 are moving toward the station, eliminating bottlenecks in the assembly process. A controller 154 controls the operation of the assembly station 130 and communicates with other stations (not shown) upstream and downstream in the assembly process.

When disc/spacer stacks are desired having more than two discs and a single spacer (e.g., three discs and two spacers), in a preferred approach the assembly station 130 is modified to add additional robotic assembly arms to the turret assembly 136 and to add appropriate additional numbers of disc feeder and spacer feeder systems. In this way, the turret assembly 136 can continue to rotate in a single rotational direction and bring completed disc/spacer stacks 128 into alignment with the spindle motor hubs 106.

In an alternative preferred approach, the turret assembly 130 can be configured to rotate in both directions (clockwise and counterclockwise) to bring the arms 138, 140, 142, 144 into alignment with the disc feeder systems 148, 152 and the spacer feeder system 150 a desired number of times so that each arm loads a desired number of discs and spacers. It is contemplated that each arm can be operated to build a disc/spacer stack 128 having a different number of discs and spacers, as desired. This capability supports the concurrent assembly of both fully populated and depopulated disc drives (i.e., drives having either a full number or reduced number of discs) in the desired respective quantities in the same assembly process.

Figure 4:
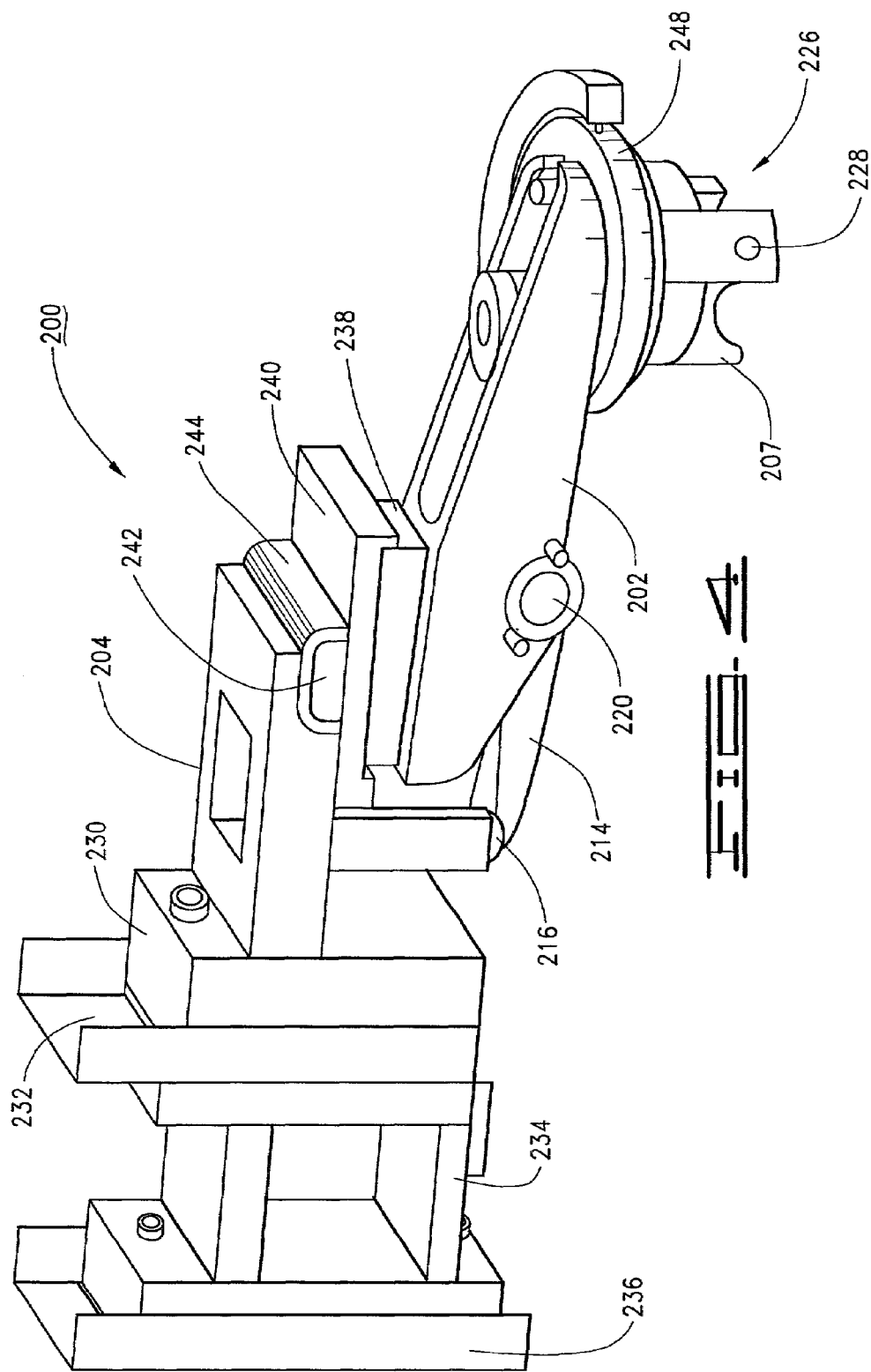
FIG. 4 is an isometric view of a selected one of the robotic assembly arms (stacker arms) of the disc stack assembly station of FIG. 3.
Figure 5:
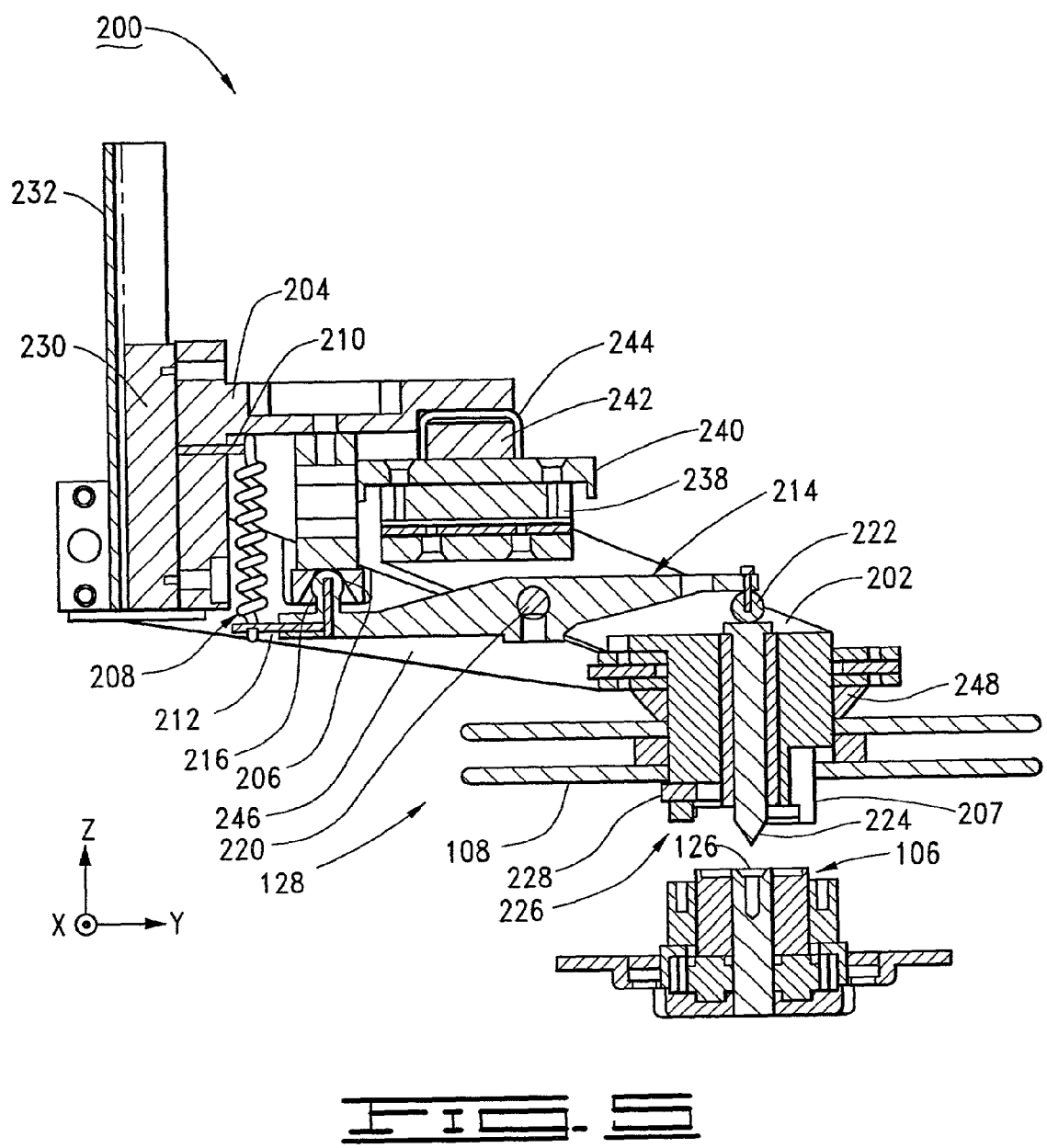
FIG. 5 is cross-sectional elevational view of the stacker arm of FIG. 4, with the assembly device shown in a locked position.
Figure 6:
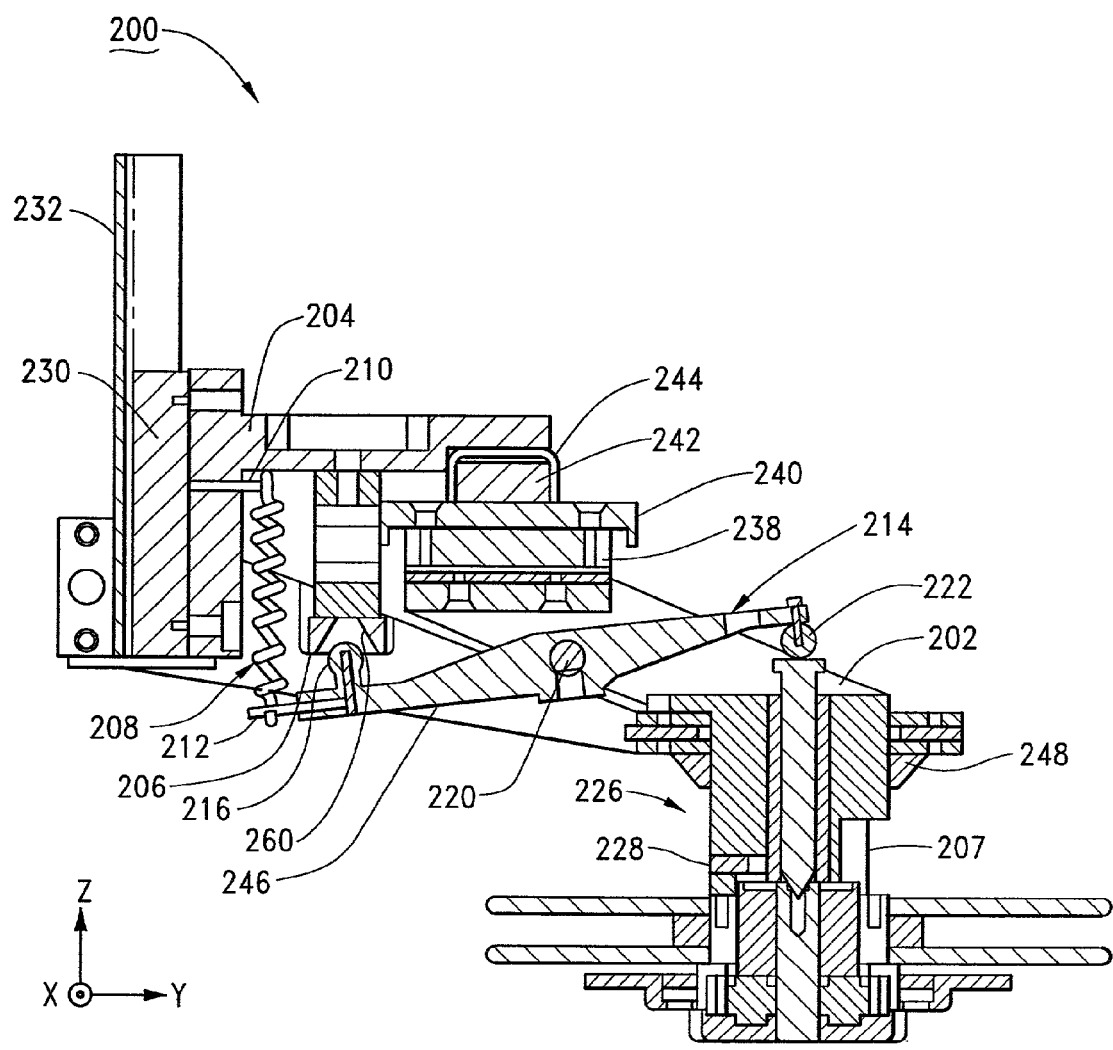
FIG. 6 is a cross-sectional elevational view of the stacker arm of FIG. 4 in an unlocked position.
Figure 7:
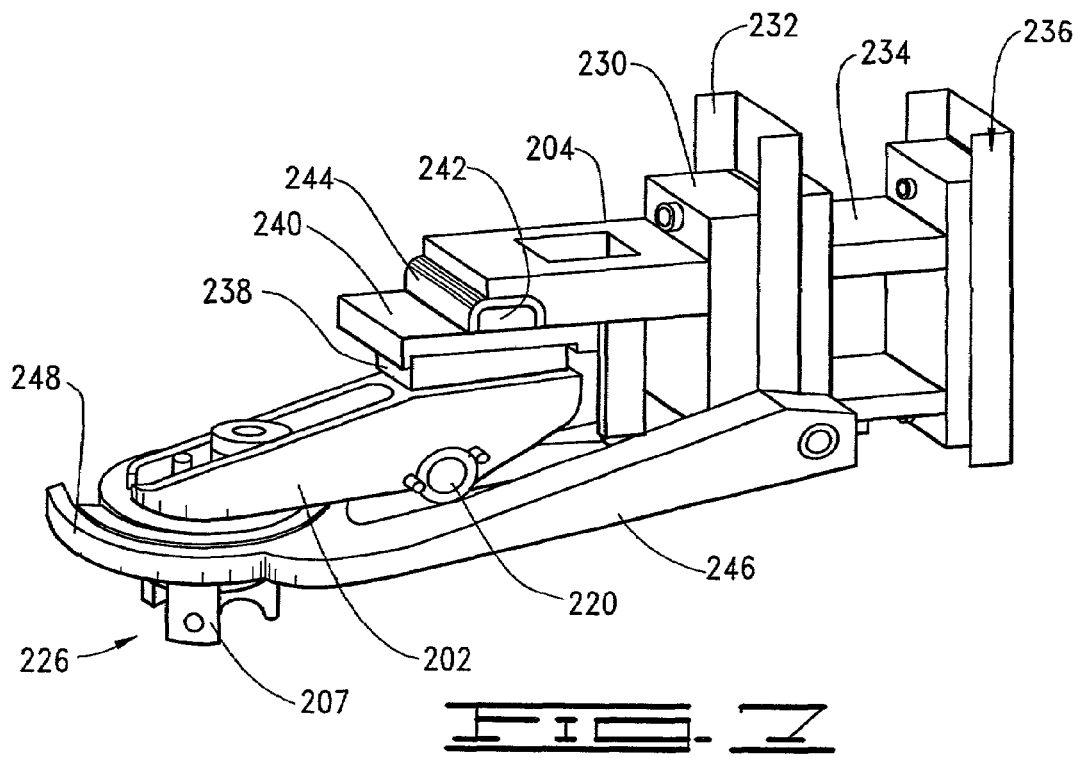
FIGS. 7 and 8 are isometric views of the stacker arm of FIGS. 4-6 showing operation of an unloading arm to transfer a completed disc/spacer assembly onto a spindle motor hub.
Figure 8:
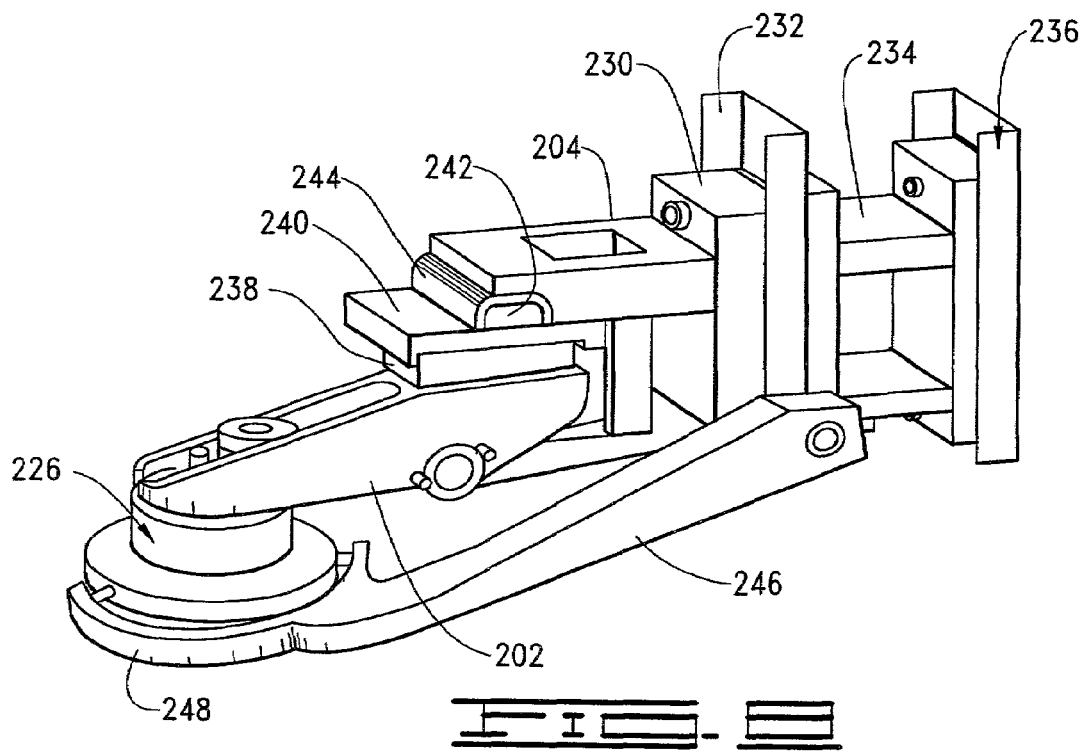

To provide additional detail concerning the construction and operation of the assembly station 130, the various articles shown in FIG. 3 will be discussed in turn. FIG. 4 provides an isometric view of a stacker arm 200 nominally identical to the stacker arms 138, 140, 142 and 144 of FIG. 3. FIGS. 5 and 6 provide cross-sectional schematic views of the stacker arm 200, and FIGS. 7 and 8 show isometric views of a side of the stacker arm 200 opposite that shown in FIG. 4. FIG. 5 shows the stacker arm 200 in a locked position and FIG. 6 shows the stacker arm 200 in an unlocked position, as explained below.

The stacker arm 200 includes a robotic arm 202 on which the disc/spacer stack 128 is formed. A frame 204 ("secondary frame") is attached to the robotic arm 202. A conical socket 206 is attached to the frame and a first end of a tension spring 208 is attached to a member 210 that is rigidly attached to the frame 204. A spring constant, or stiffness, of the spring 208 is chosen to fit the demands of a particular application.

A second end of the tension spring 208 is attached to a first end 212 of a locking arm 214 to bias a socket ball 216 in the socket 206. With the socket ball 216 biased in the socket 206, as shown in FIG. 5, the locking arm 214 is in the locked position. The socket ball 216 is displaced from the socket 206 in FIG. 6 to illustrate the unlocked position. For purposes herein, the socket ball 216 is more generally referred to as an engagement portion which establishes a reference position with respect to the frame (via socket 206). It will be noted that other configurations for the engagement portion can readily be used, such as a reversal of the location of the ball and socket as well as other contact surface shapes besides a spherical ball (such as a cone, etc.). It will further be noted that other locations for the engagement portion besides at the distal end of the locking arm 214 can be used, as desired.

A medial portion of the locking arm 214 is pivotally attached to a rod 220, which is in turn rigidly attached to the robotic arm 202. A ball contactor 222 is positioned at a second end of the locking arm 214. The ball contactor 222 pressingly engages a plunger 224. The plunger 224 assists the stacker arm 200 in centering the disc/spacer stack 128 (FIG. 2) on the spindle motor hub 106 (FIG. 2). The plunger 224 extends through a center of an end effector 226.

The end effector 226 is located at an end of the robotic 202 arm and includes a three-pronged mandrel 207 (best viewed in FIG. 4) with an outer diameter slightly smaller than an inner diameter of the discs 108 and spacers 122. The disc/spacer stack 128 is formed on the end effector 226 one piece at a time and held in place by end effector balls 228.

The end effector balls 228 are outwardly biased by springs (not separately shown) and thereby retractable so that the end effector can be passed through a disc 108 or spacer 122 by applying a sufficient downward force. After the end effector balls 228 pass through a disc 108 or spacer 122, the springs return the end effector balls 228 to a biased position to retain the discs 108 and spacers 122 on the end effector 226.

The stacker arm 200 is capable of being positioned at any point in space within a defined range of movement along orthogonal x, y and z axes (identified in FIGS. 5 and 6). The secondary frame 204 is configured for vertical movement along the z axis by a z axis slider block 230 which passes within a vertical channel member 232. The vertical channel member 232 is mounted to and supported by a primary frame 234 (see FIG. 4). The primary frame 234 is controllably advanced up and down along the z axis by a z axis elevator assembly 236 having a servo motor (not shown). A spring (not shown) normally holds the primary and secondary frames 234, 204 in a fixed relative relationship. The manner in which the z axis elevator assembly 236 and the z axis slider 230 cooperate to manipulate a disc/spacer stack along the z axis will be discussed below.

A y axis slider block 238 permits sliding movement of the robotic arm 202 through passage of the y axis slider block 238 within a channel member 240. Similarly, an x axis slider block 242 permits sliding movement of the robotic arm 202 through passage of the x axis slider block 242 within a channel member 244.

When the locking arm 214 is maintained in the unlocked position so that the socket ball 216 is displaced from the socket 206, the x and y slider blocks 238, 242 permit free movement of the end effector 226 along the respective x and y axes. This is referred to as a compliant mode. When the locking arm 214 is in the locked position so that the socket ball 216 is seated in the socket 206, the locking arm 214 retards movement of the end effector 226 along the x and y axes. This is referred to as a noncompliant mode. The z axis slider block 230 is preferably configured to provide a sufficient amount of resistance force (friction) to sliding movement along the z axis to support the weight of the frame 204 and the arm 202.

It will be noted that as long as the ball 216 remains seated in the socket 206, the ball and socket combination establishes a fixed, repeatable reference point for the end effector 226 in the x-y plane. It has been observed that a user can grasp the end effector 226 and physically move the end of the robotic arm around in space, provided sufficient force is applied to overcome the bias of the spring 208 and dislocate the ball 216 from the socket 206. However, once the user releases the end effector 226, the spring reseats the ball 216 and the end effector 226 will return to the previous x-y reference position.

The transfer of discs 108 and spacers 122 to the end effector 226 is carried out by using the elevator assembly 236 (FIG. 4) to lower the end effector 226 to a position to receive the respective disc or spacer. The plunger 224 engages an alignment feature in the associated disc or feeder system 148, 150, 152. This pivots the locking arm 214 to the unlocked position to introduce the desired compliance to allow the respective discs 108 and spacer 122 to be advanced past the effector balls 228 for retention onto the end effector 226. The process is repeated as the stacker arm 200 is advanced to each of the feeder stations 148, 150, 152 (FIG. 3) in turn to complete the disc/spacer stack 128. It will be noted that the stack is built from the top down; that is, the topmost disc 108 within the stack is placed on the end effector 226 first and the bottommost disc 108 in the completed stack is placed on the end effector 226 last.

Steps taken during the subsequent transfer of a completed disc/spacer stack 128 from the end effector 226 to a spindle motor hub 106 can be understood with a review of the cross-sectional views of FIGS. 5 and 6 and isometric views provided by FIGS. 7 and 8. Such transfer begins by using the z axis elevator assembly 230 to lower the end effector 226 into alignment with the spindle motor hub 106.

As the end effector 226 is lowered onto the hub, the plunger 224 engages the alignment feature 126, thereby unlocking the locking arm 214 and introducing the necessary compliance along the x and y axes to permit the desired alignment of the end effector 226 with the spindle motor hub 106. Preferably, the tip 224 of the plunger 226 will engage the chamfered side wall surface of the alignment feature 126. The tip 224 will follow the gradient of the side wall down to a final centered position within the alignment feature 126. In this way, the plunger 226 advantageously operates to "pull" the arm 202 as necessary along the x and y axes to achieve the desired final alignment of the end effector 226 over the spindle motor 106.

Once the end effector 226 contactingly abuts the spindle motor 106 in the desired alignment, further downward movement of the end effector 226 is prevented by an opposing, upwardly directed force induced by the spindle motor 106 (since the spindle motor 106 is supported by a pallet 132 and the conveyor system 134, FIG. 3). This condition is represented by FIG. 7 (without inclusion of the spindle motor 106).

So long as the end effector 226 has not engaged the spindle motor 106, the aforementioned spring provides sufficient retention force to cause the primary frame 234 and the secondary frame 204 to move together in tandem along the z axis in response to the operation of the elevator assembly 236. However, once the end effector 226 engages the spindle motor, further downward motion of the primary frame 234 by the elevator assembly 236 induces expansion of the spring and sliding movement between the z axis slider block 230 and the channel member 232, so that the primary frame 234 continues to move downwardly while the secondary frame 204 remains at a fixed position established by the spindle motor 106.

As best shown in FIGS. 7 and 8, a cantilevered pusher arm 246 has a proximal end affixed to the primary frame 234 and a distal end to which a disc/spacer stack pusher plate 248 is affixed. The pusher plate 248 preferably encircles the end effector 226 and normally remains in a retracted position as shown in FIGS. 4-7. Accordingly, the loaded disc/spacer stack 128 is loaded onto the spindle motor hub 106 by the continued downward movement of the primary frame 234, which causes the pusher arm 246 to advance the pusher plate 248 downwardly with respect to the end effector 226 and to push the loaded discs 108 and spacers 122 onto the spindle motor hub. FIG. 8 shows the pusher arm 246 and the pusher plate 248 in a fully extended position.

Figure 9:
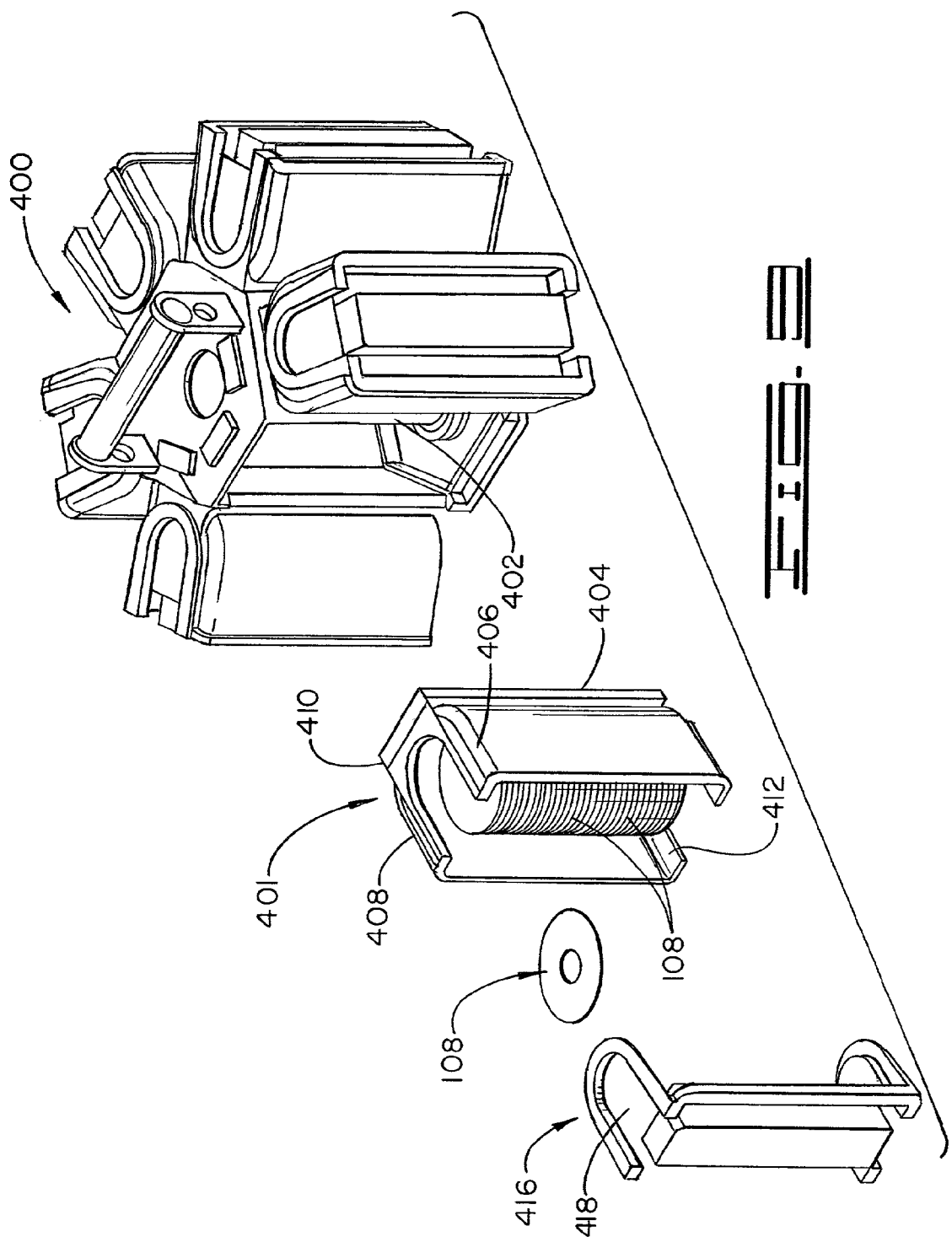
FIGS. 9 and 10 provide isometric views of a disc carousel and a disc actuator of the disc feeder systems of FIG. 3.

FIG. 9 shows an exploded, perspective view of a disc carousel 400 used in the disc feeder systems 148, 152 of FIG. 3. The disc carousel 400 supports six magazines 401 of prepackaged discs 108. The disc carousel 400 rotates about a central shaft 402. Each magazine 401 has a base 404, opposed sidewalls 406, 408, and opposed, U-shaped end walls 410, 412, that collectively define a cavity where the discs 108 are stored. The insertion of closure assembly 416, including cover 418, in between the U-shaped end walls 410, 412 closes the magazine 401. A cover removing assembly 420 (FIG. 3) removes the closure assemblies 416 to allow access to the discs 108. Attending personnel or automated equipment (not shown) remove empty magazines 401 and insert replacement loaded magazines 401 during operation.

Figure 10:
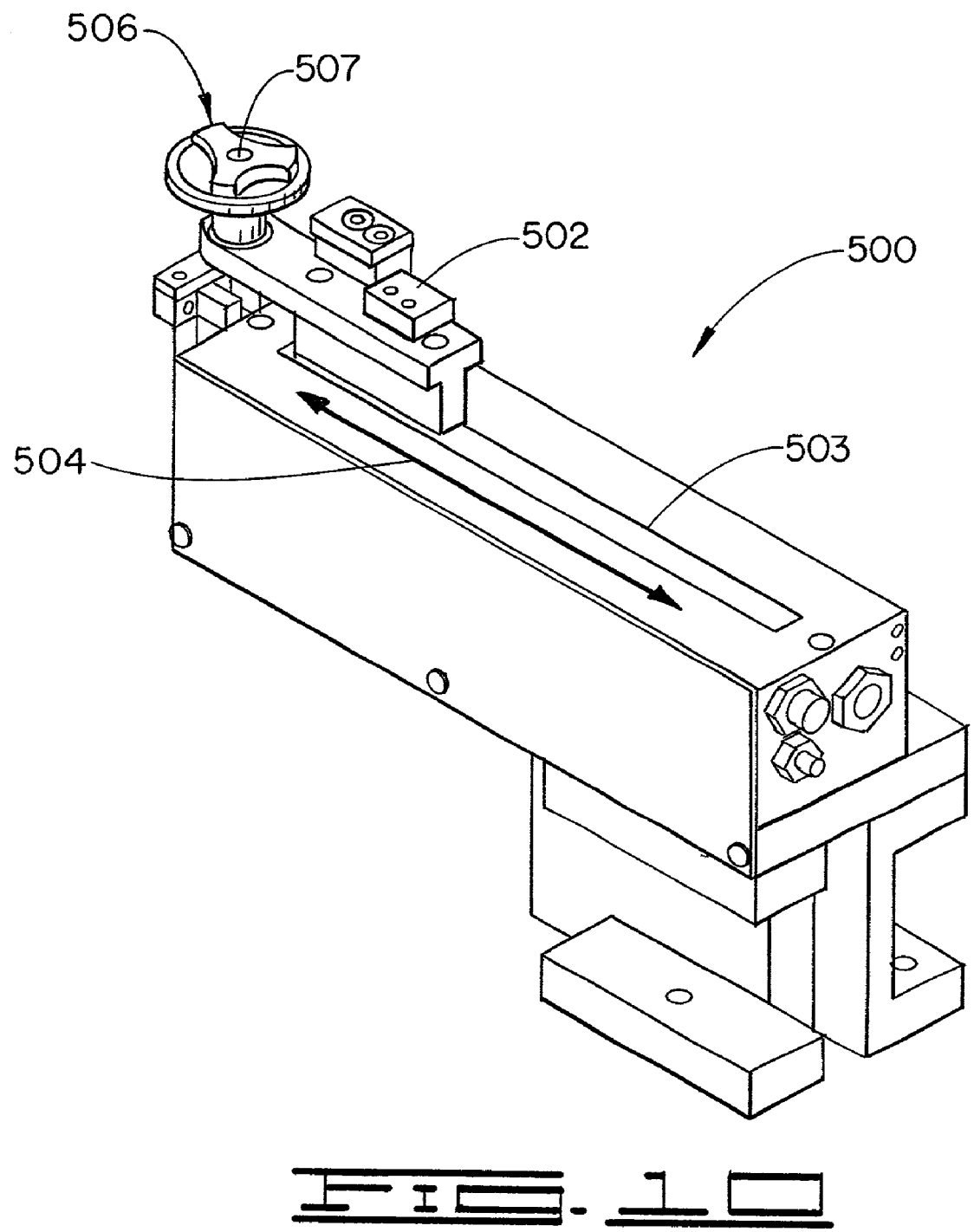

FIG. 10 shows a detailed view of a disc actuator 500 which also forms a part of each of the disc feeder systems 148, 152 of FIG. 3. The disc actuator 500 operates to advance the discs 108 from the associated disc carousel 400 to a loading position for engagement by the stacker arms 138, 140, 142, 144. The disc actuator 500 includes a slide 502 moveable along a track 503 in a direction illustrated by arrow 504 between a first shuttle position at the carousel and a second shuttle position near the arms 138, 140, 142, and 144. The slide 502 supports a disc post 506 having an alignment feature 507 similarly configured to the alignment feature 126 in the spindle motor 106.

To load a selected disc 108 onto a selected arm 138, the slide 502 advances the disc 108 from the associated magazine 401 to the second shuttle position. The arm 138 lowers onto the post 506 and engagement of the plunger (such as 224) with the alignment feature 507 places the arm 138 in the compliant mode, enabling the disc actuator 500 to advance the disc 108 past the retention balls 228 and onto the mandrel 207.

Figure 11:
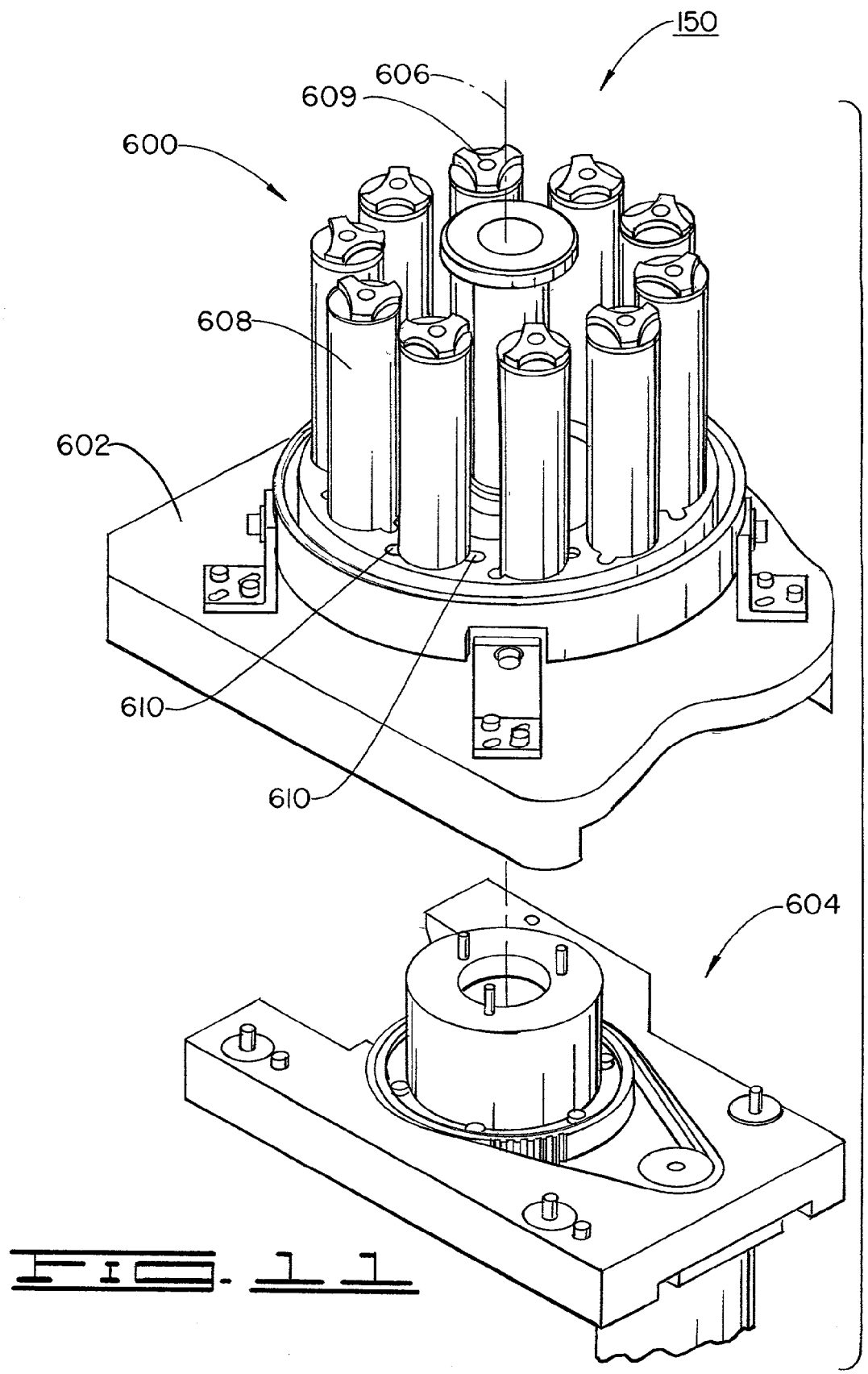
FIGS. 11 and 12 provide partially exploded, isometric views of a spacer carousel and an elevator assembly of the spacer feeder systems of FIG. 3. used by the assembly station of FIG. 3 to feed spacers to the assembly devices.
Figure 12:
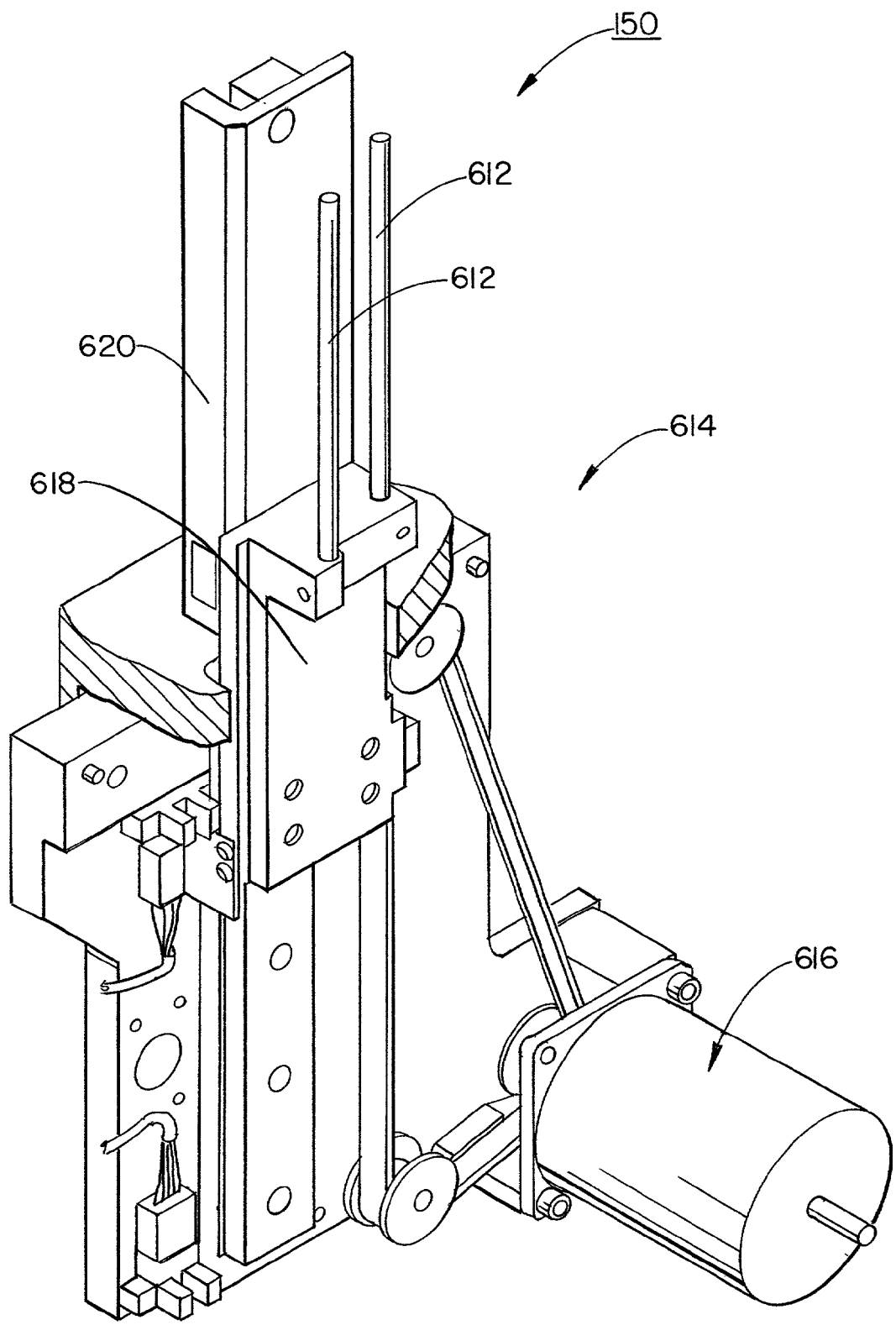

FIGS. 11 and 12 show the spacer feeder system 150 of FIG. 3 in greater detail. A spacer carousel 600 is supported by a platform 602 and is rotated by a motor assembly 604 about a rotation axis 606. The spacer carousel 600 includes a number of posts 608 each configured to retain a number of stacked spacers 122 (the spacers are not shown in FIG. 11). The motor assembly 604 advances the posts 608 for alignment with the respective stacker arms 138, 140, 142, 144. Each post includes an alignment feature 609 nominally identical to the alignment features 126, 507.

Apertures 610 at the base of each post allow spacer advancement rods 612 of an elevator assembly 614 (FIG. 12) to be upwardly directed to advance the spacers 122 in the stack about each post 608 in turn. The elevator assembly 614 uses a second motor assembly 616 to advance a slide 618 supporting the rods 612 along a vertical track 620.

To load a selected spacer 122 onto a selected arm 138, the carousel 600 is rotated to bring a selected post 608 into alignment with a spacer loading position adjacent the arm 138. The arm 138 is lowered onto the post 608 and the plunger (such as 224) engages the alignment feature 609, thereby unlocking the arm 138. The rods 612 advance the stack of spacers 122 (not shown) upwardly so that the topmost spacer about the post 608 passes over the retention ball 228 in the end effector 226. Additional retention features (not shown) can be readily added to the posts 608 to mate with the end effector 226 in such a manner to ensure retention of the remaining spacers about the post 608. Different posts 608 can be used to support spacers of different thicknesses, as desired. This is advantageous in manufacturing environments where both fully populated and depopulated drives are concurrently formed; a larger spacer having a thickness equal to the combined thickness of a smaller spacer 122 and a disc 108 (FIG. 2) can be used to provide the same overall stack height.

Figure 13:
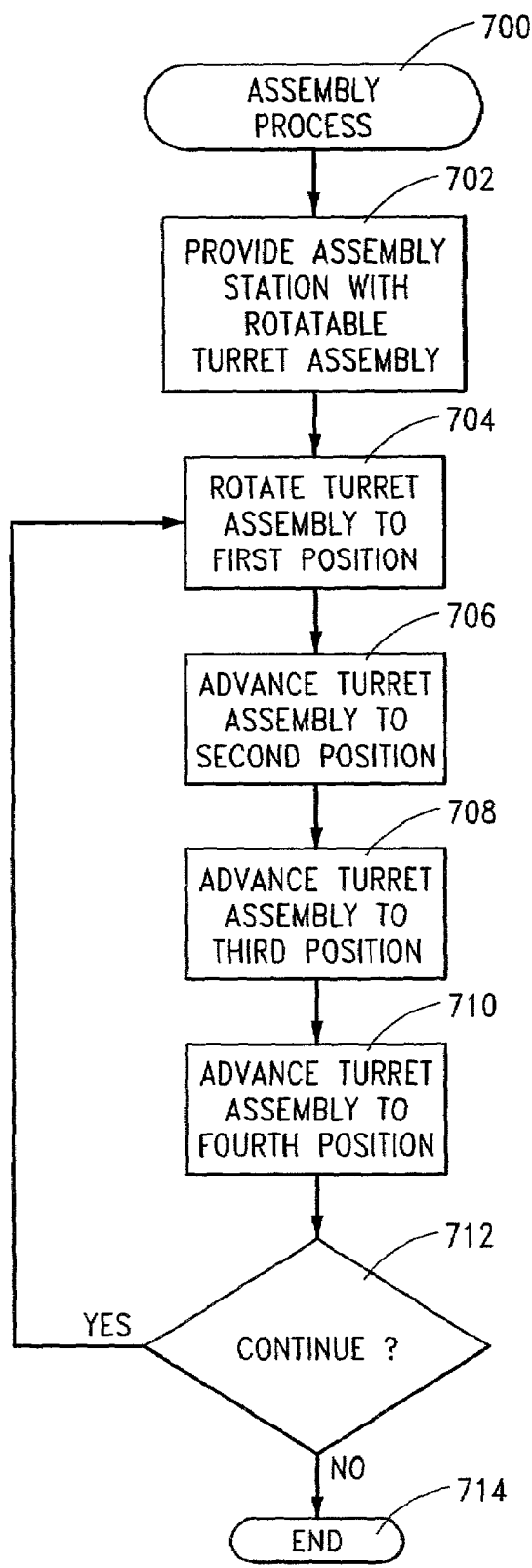
FIG. 13 is a flow chart for a DISC STACK ASSEMBLY routine, illustrative of operational steps carried out by the assembly station of FIG. 3 in accordance with preferred embodiments of the present invention.

FIG. 13 is a flow chart for an ASSEMBLY PROCESS routine 700, generally illustrative of steps carried out in accordance with preferred embodiments of the present invention to assemble and unload a stack of articles.

An assembly station having a rotatable turret assembly is initially provided at step 702. For purposes of providing a concrete example, the routine will be discussed in terms of the operation of the assembly station 130 to form and unload disc/spacer stacks 128 as shown in FIG. 2.

The turret assembly 136 is rotated to a first position as shown at step 704. Preferably, this comprises alignment of a first arm (such as 138) with the first disc feeder station 148 of FIG. 3 to allow the first arm to load a first disc 108.

The turret assembly 136 is next advanced to a second position as shown at step 706. Preferably, this results in alignment of the first arm with the disc spacer feeder station 150 to allow the loading of a spacer 122 onto the arm.

The turret assembly 136 is next advanced to a third position as shown at step 708. Preferably, this results in alignment of the first arm with the second disc feeder station 152 to allow the loading of a second disc 108 onto the arm.

The turret assembly 136 is then advanced to a fourth position as shown at step 710. Preferably, this comprises alignment of the arm with the disc unloading position (FIG. 3) over the conveyor 134 to allow the unloading of the completed disc/spacer stack 128 onto the corresponding spindle motor hub 123.

Decision step 712 determines whether continued operation is desired, and if so, the routine passes back to step 704 and the turret assembly is again moved to the first position. On the other hand, if further operation is not desired, the routine ends at step 714.

While a single stacker arm can be configured to stack articles as discussed above, such is not limiting since the assembly station can be provided with any number of desired stacker arms and article feeder stations. In a preferred embodiment in a disc drive manufacturing environment, the assembly station has a number M of disc feeder stations (such as 148, 152), N disc spacer feeder stations (such as 150) and P=M+N+1 stacker arms (such as 138, 140, 142, 144) projecting from the rotatable turret assembly.

It will be noted that when additional arms are provided on the turret assembly (such as arms 140, 142, 144), then additional loading and unloading steps with these additional arms occur as the turret assembly 136 is moved to the respective first, second, third and fourth positions of steps 704, 706, 708 and 710. In this way, multiple stacks of articles are formed simultaneously on the various stacker arms.

While exemplary embodiments hereinabove have provided an assembly station for use in a disc drive automated assembly process, such is not limiting to the scope of the invention as claimed below. Rather, any number of different types of assembled articles including but not limited to component parts, sheets of laminated material, corrugated boxes and cartons, books, recordable media, food, and lumber can be advantageously stacked and unloaded using suitable modifications to the system disclosed herein. Moreover, it is not necessary that a central aperture be formed in each of the articles to allow manipulation by an end effector as disclosed herein. Rather, any variety of end effectors can be employed depending upon the requirements of a given application to form a completed stack and unload the same.

It will now be understood that the present invention is generally directed to a method and apparatus for assembling and unloading a stack of articles.

In accordance with preferred embodiments, a first article feeder station (such as 148) provides a plurality of first articles (such as magnetic recording discs 108) at a first loading position and a second article feeder station (such as 150) sequentially provides a plurality of second articles (such as disc spacers 122) at a second loading position. A turret assembly (such as 136) supports at least one stacker arm (such as 138). The turret assembly moves to the first loading position to load a selected first article onto the stacker arm (such as by step 704), advances to the second loading position to load a selected second article onto the stacker arm (such as by step 706), and then moves to an unloading position to concurrently unload the first and second selected articles from the stacker arm (such as by step 710).

Preferably, the first and second articles comprises respective numbers of magnetic recording discs (such as 108) and disc spacers (such as 122) which are formed into a disc/spacer stack (such as 128). The completed disc/spacer stack is unloaded onto a spindle motor hub (such as 123).

Preferably, the turret assembly rotates in a common rotational direction to each of the disc loading position, the spacer loading position and the unloading position in turn. Additional stacker arms are provided to different ones of the disc and spacer feeder stations so that as the first stacker arm is rotated to a selected one of the disc loading position, the disc spacer location and the unloading position, a second stacker arm is rotated to a remaining one of the disc loading position, the disc spacer location and the unloading position to respectively load a second disc onto the second end effector, load a second spacer onto the second end effector or concurrently transfer the second disc and the second spacer onto a second spindle motor hub.

The assembly station is preferably part of a disc drive automated assembly process which uses a conveyor system (such as 134) to advance spindle motor hubs (such as 106) to the assembly station on pallets (such as 132).

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the disc stack assembly station without departing from the spirit and scope of the present invention.

In addition, although the embodiments described herein are directed to an assembly device for assembling a disc drive, it will be appreciated by those skilled in the art that the disc stack assembly station can be used for other devices without departing from the spirit and scope of the claimed invention.

What is claimed is:

1. An apparatus for forming stacks of articles, comprising:
a first article feeder station presenting a plurality of first articles at a first loading position;
a second article feeder station presenting a plurality of second articles of a characteristic different size than the first articles at a second loading position; and
a bidirectionally rotatable turret assembly comprising:
a first stacker arm supported by the turret assembly and selectively movable in either a clockwise direction or a counterclockwise direction to a selected one of the first and second loading positions; and
a second stacker arm supported by the turret assembly and responsively movable, by the selected movement of the first stacker arm, to another loading position; and
end effectors independently operable on each of the stacker arms, each end effector having a mandrel sized to simultaneously support a plurality of the first and second articles from the respective feeder stations to form alternating stacks of the first and second articles on both stacker arms.

2. The apparatus of claim 1, wherein the turret assembly rotates in one direction in relation to stacking said first article from the first loading position on the first stacker arm, stacking said second article from the second loading position on the first stacker arm, and unloading the stacked first and second articles from the first stacker arm at an unloading position.

3. The apparatus of claim 1, wherein the turret assembly rotates in a first rotational direction in relation to moving the first stacker arm from the first loading position to the second loading position, and then rotates in a second rotational direction opposite the first rotational direction in relation to moving the first stacker arm from the second loading position to an unloading position.

4. The apparatus of claim 1, wherein the first article feeder station comprises a first disc feeder station which provides magnetic recording discs at the first loading position, wherein the second article feeder station comprises a spacer feeder station which provides disc spacers at the second loading position, wherein the stacker arms form disc/spacer stacks.

5. The apparatus of claim 4, further comprising a conveyor system adjacent the turret assembly, wherein the spindle motor hub is transported by the conveyor system to the unloading position to receive the disc and the disc/spacer stacks.

6. The apparatus of claim 4, further comprising a second disc feeder station which provides magnetic recording discs at a third loading position.

7. The apparatus of claim 1, wherein each stacker arm comprises an end effector disposed at a distal end of the arm, the end effector capable of loading the first and second articles in a stacked orientation.

* * * * *

UNITED STATES PATENT AND TRADEMARK OFFICE
CERTIFICATE OF CORRECTION

PATENT NO. : 7,371,041 B2  Page 1 of 1
APPLICATION NO. : 10/106755
DATED : May 13, 2008
INVENTOR(S) : Michael W. Pfeiffer et al.

It is certified that error appears in the above-identified patent and that said Letters Patent is hereby corrected as shown below:

In Col. 10, line 67 Claim 5
replace "wherein the"
with "wherein a."

In Col. 11, line 2 Claim 5
replace "the unloading"
with "an unloading."

In Col. 11, line 2 Claim 5
replace "receive the disc and the disc/spacer"
with "receive one of the disc/spacer."

Signed and Sealed this

Twenty-ninth Day of July, 2008

JON W. DUDAS
*Director of the United States Patent and Trademark Office*